US007505736B2

(12) United States Patent
Min (10) Patent No.: US 7,505,736 B2
(45) Date of Patent: Mar. 17, 2009

(54) AERONAUTICAL BROADCAST AND COMMUNICATION SYSTEM

(75) Inventor: Byung Kon Min, Palo Alto, CA (US)

(73) Assignee: Nubron, Inc., Palo Alto, CA (US)

( * ) Notice: Subject to any disclaimer, the term of this patent is extended or adjusted under 35 U.S.C. 154(b) by 786 days.

(21) Appl. No.: 10/921,281

(22) Filed: Aug. 18, 2004

(65) Prior Publication Data

US 2006/0040612 A1     Feb. 23, 2006

(51) Int. Cl.
*H04B 7/185*     (2006.01)
(52) U.S. Cl. ................... 455/12.1; 455/3.02; 455/427; 455/13.2; 370/316; 370/338
(58) Field of Classification Search ............... 455/3.02, 455/427, 12.1, 13.2, 98; 701/120, 13, 215; 342/352; 370/316, 338
See application file for complete search history.

(56) References Cited

U.S. PATENT DOCUMENTS

| | | | |
|---|---|---|---|
| 4,872,015 A | 10/1989 | Rosen | |
| 5,303,393 A | 4/1994 | Noreen et al. | |
| 5,760,819 A | 6/1998 | Sklar et al. | |
| 5,835,487 A | 11/1998 | Campanella | |
| 5,966,442 A * | 10/1999 | Sachdev | 380/212 |
| 5,990,928 A | 11/1999 | Sklar et al. | |
| 6,032,041 A * | 2/2000 | Wainfan et al. | 455/427 |
| 6,044,323 A * | 3/2000 | Yee et al. | 701/120 |
| 6,151,497 A | 11/2000 | Yee et al. | |
| 6,201,797 B1 | 3/2001 | Leucan et al. | |
| 6,324,405 B1 | 11/2001 | Young et al. | |
| 6,477,152 B1 | 11/2002 | Hiett | |
| 6,529,706 B1 | 3/2003 | Mitchell | |
| 6,549,162 B1 | 4/2003 | Gage et al. | |
| 6,574,338 B1 | 6/2003 | Sachdev | |
| 6,643,509 B1 * | 11/2003 | Crow | 455/431 |
| 6,741,841 B1 * | 5/2004 | Mitchell | 455/188.1 |
| 2002/0118137 A1 * | 8/2002 | Halsema et al. | 343/705 |
| 2003/0200013 A1 * | 10/2003 | Chakravarty et al. | 701/11 |
| 2003/0233658 A1 * | 12/2003 | Keen et al. | 725/76 |

(Continued)

*Primary Examiner*—Duc Nguyen
*Assistant Examiner*—Dominic E Rego
(74) *Attorney, Agent, or Firm*—Clement A. Berard, Esq.; Dann, Dorfman, Herrell & Skillman, PC (57) ABSTRACT

A method and system for a plurality of airplanes in flight to receive from and send to a plurality of ground stations broadcast and communication signals through a single or a plurality of geostationary satellites, wherein at least the mobile link between said airplanes and said satellite, uplink or downlink, uses the high frequency radio waves at 17 GHz or higher, such as Ka-band. The fixed link between said satellite and said ground stations may use any radio frequencies below the frequencies used to communicate between the satellite and the aircraft. The lower frequencies tend to be less susceptible to rain attenuation and hence suitable for closing the fixed broadcast and communication link. Frequencies such as C-band or Ku-band, or even Ka-band, are applied between satellite and ground such that the available link margin is sufficient to overcome rain attenuation at said ground stations. Said satellite carries a plurality of transponders that may include a plurality of frequency converters to enable the conversion between different frequencies. Said satellite generates a plurality of spot beams, shaped or unshaped, which collectively cover the flight routes of said airplanes, preferably the geodesic path between two highly populated regions.

24 Claims, 6 Drawing Sheets

U.S. PATENT DOCUMENTS

2004/0157563 A1* 8/2004 McLain et al. ........... 455/67.11
2004/0219879 A1* 11/2004 Stephenson ................ 455/12.1
2005/0053026 A1* 3/2005 Mullan et al. ................ 370/316
2005/0219119 A1* 10/2005 Hsu ...................... 342/357.03

* cited by examiner

FIG_4

FIG._6

AERONAUTICAL BROADCAST AND COMMUNICATION SYSTEM

CROSS-REFERENCE TO RELATED APPLICATIONS

This application claims the benefit of Provisional Application No. 60/497,155 entitled "METHOD AND SYSTEM FOR AERONAUTICAL BROADCAST AND COMMUNICATION" which was filed on Aug. 21, 2003.

FEDERALLY SPONSORED RESEARCH

Not Applicable

SEQUENCE LISTING OF PROGRAM

Not Applicable

BACKGROUND OF INVENTION—FIELD OF INVENTION

This invention relates to aircraft in-flight entertainment and communication systems and more specifically the delivery of Internet services and live audio and video programming services,

BACKGROUND OF THE INVENTION

This invention applies a novel frequency apportionment method that favors greater system efficiencies, higher data capacity and superior quality-of-service over in-flight entertainment and communication systems known in the art.

Typical satellite communication systems uplink to the satellite at a higher frequency than they downlink to the user, whether the user is a fixed or mobile terminal. Each of the herein referenced patents employs a satellite that receives a signal from the ground and translates it to a lower frequency to rebroadcast the signal to the user.

Novelty in the present invention is achieved by inverting this arrangement such that a satellite employed in the present invention communicates to the ground station at frequencies lower than it communicates to the user.

The present invention improves over the known art by the method of frequency apportionment whereby the greatest bandwidth, available with the higher frequencies, is apportioned to the mobile user communications links while the lower frequencies that propagate with lower rain attenuation are reserved for the fixed satellite-to-ground communications links.

Compared to widely used frequency waves, such as C-band or Ku-band, higher frequency radio waves, such as Ka-band, or V-band permit use of smaller antennas, and result in less adjacent satellite interference for satellite broadcast and communication This provides more useable bandwidth per transponder.

Communication links for satellite-to-ground at high radio frequencies, for example at Ka-band, suffer significantly more from rain attenuation than at lower frequencies such as C-band or Ku-band.

The nominal frequency of 17 GHz corresponds to a natural inflection point above which the rain attenuation of higher frequency radio waves rapidly increases. The naturally indicated 17 GHz is the logical demarcation between "lower" and "higher" frequencies.

High frequency communication links between aircraft flying above 4,500 m and typical communication satellites at low earth orbits, medium earth orbits, or geosynchronous orbits do not suffer significantly from rain attenuation, as there are practically no rain clouds at this altitude and above.

Thus Ka-band offers significantly greater data capacity to the user in the air than to those on the ground due to absence of rain attenuation. Furthermore, more bandwidth is available in Ka-band than in the lower, more commercially exploited frequencies such as C-band or Ku-band.

The present invention takes the above into consideration.

Thus a salient point of novelty to the present invention is the user communicates over a mobile satellite link at frequencies above 17 GHz (17,000,000,000 Hz), such as Ka-band or V-band, or optical frequencies for delivery in the mobile links from air to satellite and from satellite to air.

In the present invention, communications from ground to satellite or from satellite to ground may use lower frequencies such as C-band and Ku-band that are relatively less susceptible to rain attenuation. In this case, similar high frequencies such as Ka-band may also be used if sufficient link margin exists, although the frequencies that communicate between satellite and ground remain less than frequencies between satellite and air.

A satellite generates a plurality of spot beams, which collectively cover the flight routes of said airplanes, preferably the geodesic paths between two highly populated regions.

The signals received by the aircraft may include DBS downlink, Internet, weather and flight command data. The signals transmitted by the aircraft may include Internet uplink, flight data, airplane health data, and/or airline status video such as closed circuit TVs.

There is no background in the present art for a communications satellite system that provides the very high bandwidth that the present invention enables. Notably, U.S. Pat. No. 5,966,442 claims a system for providing real-time broadcast programs to aircraft passengers comprising a broadcast station, a relay stations and broadcast receiver in the 3 GHz range. The satellite uplinks are in this case at about 7 GHz. Similarly, U.S. Pat. No. 6,529,706 B1 claims an aircraft satellite system for distributing a broadcast satellite Internet link to an aircraft. A direct broadcast satellite is used in this system that has uplink frequencies in the 17 GHz frequency band and downlink frequencies to the user in the 12 GHz frequency band. This is likewise the case with therein referenced and included U.S. Pat. No. 5,760,819. In the same manner, the data communications system for aircraft in U.S. Pat. No. 6,477,152 B1 employs a DBS satellite that has uplink frequencies in the 17 GHz band and downlink frequencies to the user in the 12 GHz band. Patent search revealed no known art to provide a system that communicates with the user through a satellite at a frequency greater than used to uplink to the satellite from the ground, specifically related to communications to aircraft for in-flight entertainment and communication.

BACKGROUND OF INVENTION—OBJECTS AND ADVANTAGES

The present invention improves over the known art by the method of frequency apportionment whereby the greatest bandwidth, available with the higher frequencies, is apportioned to the mobile user communications links while the lower frequencies that propagate with lower atmospheric attenuation are reserved for the fixed satellite-to-ground communications links. The naturally indicated 17 GHz is the logical demarcation between "lower" and "higher" frequencies.

Hence in the present method and system it is the related use of frequencies above 17 GHz, such as Ka-band or V-band, or optical frequencies, for mobile communications links between air and satellite, and the use of lower frequencies such as the use of C-band or Ku-band or even Ka-band frequencies for communications links between satellite and ground, that provides greater user bandwidth and signal strength and thus results in superior data capacity, quality-of-service and enhanced overall system efficiency.

It is an object of the present invention to provide superior data capacity in the provision of Internet and direct broadcast content by allocation of the greatest bandwidth enabled by the higher frequencies present in the communications between the satellite and air, while reserving the lowest frequencies to communicate between the satellite and the ground, with 17 GHz identified as the demarcation between "high" and "low" frequencies.

It is an object of the present invention to methodically apportion the frequencies above 17 GHz to mobile communications between satellite and air ($f_{air}$) while reserving the frequencies below $f_{air}$ to communicate between satellite and the ground for the purpose of efficiently providing maximum bandwidth to each system user.

It is an object of the present invention to provide DBS and Internet services to aircraft in a manner that maximizes user bandwidth.

It is an object of the present invention to facilitate digital communications data services to aircraft including; private network data, security data, aircraft and passenger health and safety data, and flight command and weather data, also all manner of video, audio and textual information.

It is an advantage of the present invention that substantially larger bandwidth is available because more bandwidth has been allocated by the International Telecommunications Union (ITU) at higher frequencies which have been less used to date.

It is an advantage of the present invention that higher frequencies correspond to smaller antennas, which reduce aerodynamic drag.

It is an advantage of the present invention that higher frequencies correspond to reduced levels of adjacent satellite interference.

It is an advantage of the present invention that it more effectively overcomes rain attenuation because the rain-susceptible higher frequencies are used above the rain to communicate between the satellite and the air while the less susceptible lower frequencies are used through the rain to communicate between the satellite and the ground, with 17 GHz as a logical demarcation between "high" and "low".

It is an advantage of the present invention that airplane flight paths typically follow geodesic routes that are effectively and efficiently covered by shaped or unshaped spot beams projected from geostationary satellites.

It is a feature of the present invention that it affords the economy of existing satellite-based broadcast and communication infrastructure that may use lower frequencies such as C-band or Ku-band for communications between the satellite and the ground and higher frequencies such as Ka-band for the mobile communications between the satellite and the air.

SUMMARY OF THE INVENTION

The present invention provides airborne passengers with Direct Broadcast Service (DBS) contents, access to broadband Internet, and voice and data services. In addition, it provides the airlines with a means to upload and download airplane flight, health and security data continuously and in real time.

The present invention is a method and system for both broadcasting to airplanes in flight and providing data communications between an airplane in flight and ground stations through one or a plurality of geostationary satellite(s) in which the link between air and satellite uses the high frequency radio waves at 17 GHz or higher. The radio waves at these frequencies are susceptible substantially to rain attenuation at low altitude, but not significantly at, say 4,500 m or above at which most commercial airplanes cruise. The link between the satellite and the ground stations may use any lower radio frequencies that are suitable for closing the link between the ground stations and satellite by overcoming rain attenuation. These frequencies may include C-band and Ku-band that are less susceptible to rain attenuation, or even Ka-band if link margin is sufficient.

A satellite generates a plurality of spot beams, which collectively cover the flight routes of said airplanes, preferably the geodesic paths between two highly populated regions. The signals received by the aircraft may include DBS downlink, Internet, weather and flight data. The signals transmitted by the aircraft may include Internet uplink, flight data, airplane health data, and/or airline status video such as closed circuit TVs.

BRIEF DESCRIPTION OF THE DRAWINGS

The invention will be better understood by reading the detailed description of the preferred embodiment in conjunction with the appended drawings as briefly described wherein.

DETAILED DESCRIPTION

Figure 1:
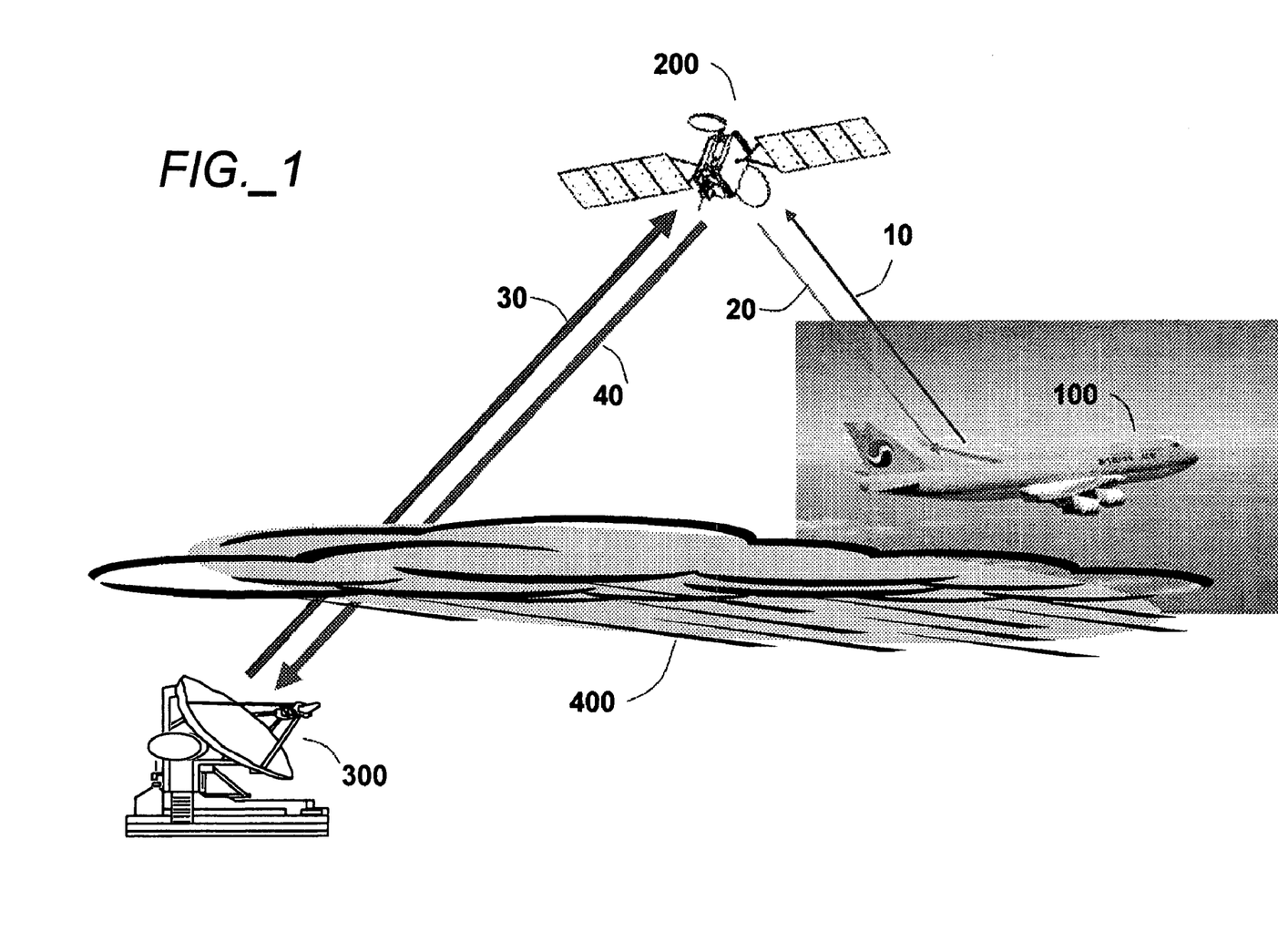
FIG. 1 schematically illustrates an embodiment of the present invention, an aeronautical broadcast and communication system, comprising one or more airplane(s) in flight above rain clouds, one or more geostationary satellite(s), one or more ground station(s) below rain clouds, and assigned radio wave frequencies.

The present invention is illustrated in the accompanying figures in which like reference numerals indicate similar elements and in which:

FIG. 1 illustrates an embodiment of the present invention, comprising one or more airplane(s) in flight 100, one or more geostationary satellite(s) 200, and one or more ground station(s) 300.

The broadcast and communication uplink 10 and downlink 20 between the airplane 100 and the satellite 200 use radio frequency radio waves at 17 GHz or higher, such as Ka-band, or V-band, or optical frequencies, which are susceptible substantially to rain 400 attenuation at low altitudes, but not significantly at the threshold altitude, approximately 4,500 m or above, at which most long range commercial airplanes cruise. The broadcast and communication uplink 30 and downlink 40 between the satellite 200 and the ground station 300 may use any radio frequencies that are suitable for carrying broadband signals and also suitable for closing the link between said ground station and said satellite. These said radio frequencies may include C-band and Ku-band that are less susceptible to rain attenuation or Ka-band if the link between said satellite and said ground stations can be still closed even with rain attenuation.

Figure 2:
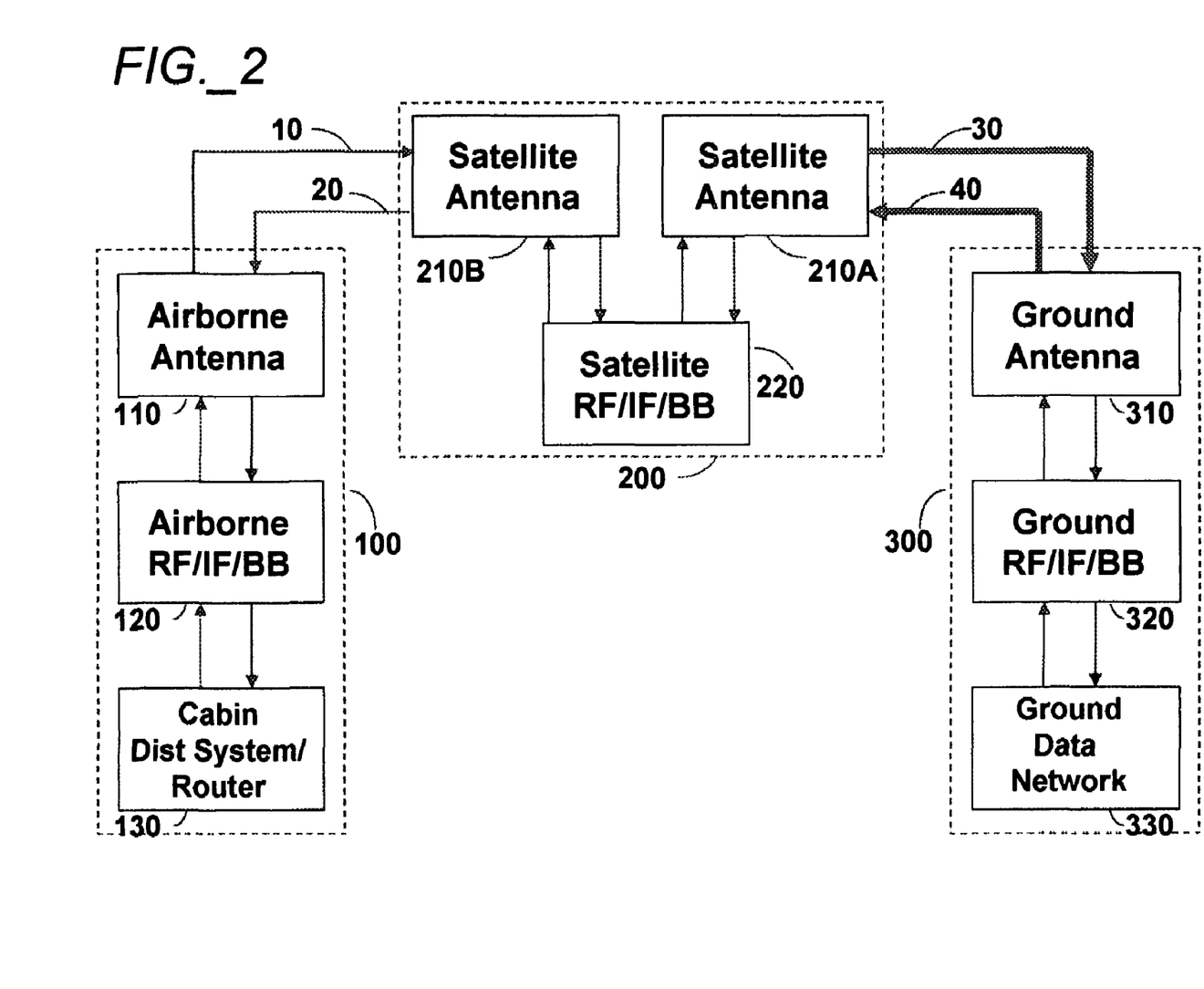
FIG. 2 illustrates an embodiment of the present invention in more detail by a schematic block diagram. Each of the airborne segment, satellite segment, and the ground station segment is further broken down to lower level components connected for forward link, return link, or two way broadcast and communications.

FIG. 2 illustrates an embodiment of the present invention in more detail by a schematic block diagram. The airplane segment 100 is further broken down into the airborne receive and transmit antennas 110, airborne RF/IF/BB equipment 120, and In-flight Entertainment (IFE) cabin distribution system and router 130. The satellite segment is further broken down into receive and transmit antennas 210 and satellite RF/IF/BB equipment 220. The ground station segment is further broken down into the ground receive and transmit antennas 310, ground RF/IF/BB equipment 320, and ground network 330.

The forward link operates according to the following procedure: video and audio contents and Internet data originating from the ground network 330 are modulated by the RF/IF/BB 320 and transmitted to said satellite by the ground transmit antenna 310. Said contents and data are then received by said satellite receive antenna 210, converted to transmit signals by the satellite RF/IF/BB equipment 220, then broadcast to said airplanes via the satellite transmit antenna 210 in 17 GHz or higher frequencies to said spot beams 510-540, 610-640. On said airplanes flying inside any of said spot beams, said signals are then received by the airborne antennas 110, converted into base band signals by the airborne RF/IF/BB equipment 120, then fed into the IFE cabin distribution system and router 130.

The return link operates in the opposite direction. For instance, the internet content and airplane health data originating from the airplane passengers, crew, and onboard computers are combined at the cabin distribution system and router 130, modulated into RF signals by the airborne RF/IF/BB equipment 120, then transmitted via said airborne transmit antenna 110 to said satellite. Said signals are then received by said satellite receive antenna 210, converted to transmit signals by said satellite RF/IF/BB equipment 220, then transmitted to said ground stations 300 via said satellite transmit antenna 210.

On said ground stations, said signals are then received by said ground receive antennas 310, converted into suitable signals by said ground RF/IF/BB equipment 320, then fed into said ground network 330 for further distribution and use.

The ground antenna 310 and ground RF/IF/BB equipment 320 may be part of one or more Regional Uplink Facilities (RUFs). The ground network 330 preferably comprises one or more Network Control Centers (NCCs) connected to broadcast content sources, return link data users, and Internet.

A Network Control Center (NCC) serves one or more Regional Uplink Facilities (RUF) and may be physically separate or co-located with one of them. Except for the special case where the NCC and the RUF are co-located, communications between the NCC and the RUF are by means of dedicated leased terrestrial lines or satellite channels, or by means of the public Internet. In the case of the latter, all communications are encrypted via VPN channels to prevent theft of service and ensure privacy of communications.

The NCC contains equipment and personnel to perform several functions as follows:

(a) The Content Servers organize and provide multiple video and audio program material from a variety of sources such as recordings, direct feed or locally generated. This program material is compressed, stored, and transmitted to the Regional Uplink Facilities (RUFs).

Each video program channel is preferably compressed to conserve bandwidth.

Video program material is digitized and compressed preferably by means of MPEG (or equivalent) encoders before being stored in the Content Server. They are then sent, under scheduling commands from the Content Management System, to the Streaming Servers at the RUF. In general, this material is sent to the RUF at a rate that may be different (greater or less) than the rate of eventual transmission to the aircraft. Program material may include targeted advertisement and programming in multiple languages appropriate to the region(s) of operation.

(b) The Content Management System controls and monitors the flow of program material from the Content Servers at the NCC to the Streaming Servers at the RUF and also control, schedule and monitor the flow of program material from the Streaming Servers to the uplink(s) to satellite(s) and to the individual user terminals.

(c) The Conditional Access System (CAS) selectively authorizes the end users (individual aircraft and/or individual passengers) to receive part or all of the available services such as video and audio streams, and Internet connectivity. The CAS monitors utilization volume as a function of time by individual users and/or aircraft and quality of service in order to generate billing data.

(d) The Subscriber Management & Billing System (SMBS) is the interface between the end user (airline and/or individual user) and the CAS. The SMBS sets up and controls the permission database used by the CAS to selectively authorize or deny services to end users. The SMBS also utilizes the raw usage data collected by the CAS to generate customer bills.

Access to individual services may be pre-authorized, for example video and audio broadcast content contracted by an Airline for some or all of their flights; or may be provided on a pay-as-you-go basis, for example Internet connectivity for individual passengers charged to the passenger's credit card on a per-session basis.

As the services deploy worldwide, billing data may optionally be sent to a Central Billing Facility (not shown) to generate consolidated service bills in the appropriate language(s) and currency of the customer.

(e) The Network Management System (NMS) controls and monitors all equipment in the Regional Uplink Facility and in the airborne equipment on board all equipped aircraft in the region. The NMS is responsible for scheduling the operation of each active unit, both in the RUF and the airborne equipment. The NMS queries and collects telemetry information from all equipment indicating operational and health status, mode and parameters of operation of all units. The NMS is capable of detecting failures and switching spare backup equipment in place of failed equipment.

The Regional Uplink Facility (RUF) is the interface point between the Network Control Center and one or more satellite(s) serving a particular geographic region.

The RUF collects and formats all content, including broadcast video and audio and Internet signals, for transmission to the satellite and from there to aircraft in the served region. The RUF also collects return Internet signals transmitted from the aircraft back to the satellite and from there to the RUF. The satellite operates as a "bent pipe", that is, it performs frequency translation and amplification of the forward link (RUF to Aircraft) and return link (Aircraft to RUF) signals but does not perform demodulation or remodulation or any baseband processing of these signals. All processing is thus done at the RUF and Aircraft ends of the transmission channel. The RUF equipment is normally under operational control of the NCC but can be operated locally at the RUF if necessary. The RUF contains equipment to perform the following functions.

(a) The MPEG program video and audio content streams from the Content Server at the NCC are received and stored at the MPEG Streaming Servers at the RUF. The Content Management System at the NCC, which controls operation of the MPEG Streaming Servers, schedules these programs for transmission. Each Streaming Server is typically capable of streaming several video and audio streams simultaneously.

(b) Preferably real-time news and sports programming is received at the RUF from local TV stations and/or satellite feeds (under license from the broadcaster and content provider). These channels are received by means of a bank of standard receivers, where they are decoded and converted to analog video and audio channels. These analog channels are then digitized, encoded and compressed by means of a bank of MPEG (or equivalent) encoders to provide the low data rate required for transmission to the satellite.

(c) The Conditional Access Gateway provides Internet connectivity to and from the individual aircraft via the satellite. Permission or denial of Internet access from an end user is under the control of the Conditional Access System at the NCC.

The Conditional Access Gateway also provides connectivity to network management messages from the NCC to and from the RUF equipment and to and from individual aircraft. These messages include:
1) Control, scheduling and monitoring of all equipment at the RUF
2) Control, scheduling and monitoring on all equipment on board all equipped aircraft currently being managed in the region
3) Handling requests for special services (such as Internet access) from individual passengers on board those aircraft by passing such requests to the Subscriber Management and Billing System at the NCC (d) The IP-DVB Formatter formats and buffers uplink digital packets, including Internet packets, so the DVB MUX can insert them into the composite uplink data stream.

Depending on the number of uplink channels to be transmitted to the satellite, there may be several IP-DVB Formatter units.

(e) The DVB-MUX multiplexes the various digital video/audio/data streams from the Streaming Servers, the Real-Time Receiver/MPEG Encoder farm and the IP-DVB Gateway into one composite digital stream. The Uplink Encoder then adds Reed-Solomon and Viterbi (or Turbocode) forward error correction and access control encoding.

Depending on the number of uplink channels to be transmitted to the satellite, there may be several DVB MUX/Uplink Encoder units.

(f) The Modulator takes the output digital stream from the Encoder and modulates a subcarrier using QPSK, 8PSK, 16, 32 or 64 QAM modulation. This subcarrier is then frequency converted to the uplink frequency and transmitted to the satellite.

Depending on the number of uplink channels to be transmitted to the satellite, there may be several Modulator Units.

(g) The Downlink Receiver receives and demodulates the return link from several aircraft via the satellite.

Depending on the number of aircraft and the satellite; there may be several Downlink Receiver Units.

(h) The Decoder and Error Correction Unit takes the output of the Downlink Receiver and applies Reed-Solomon and Viterbi (or Turbocode) error correction to the received signal. The unit also decodes the access control encoding of the transmitted packets and provides the decoded signal to the Conditional Access Gateway.

Depending on the number of aircraft and of the satellites; there may be several Decoder and Error Correction Units, one for each Downlink Receiver.

Figure 3:
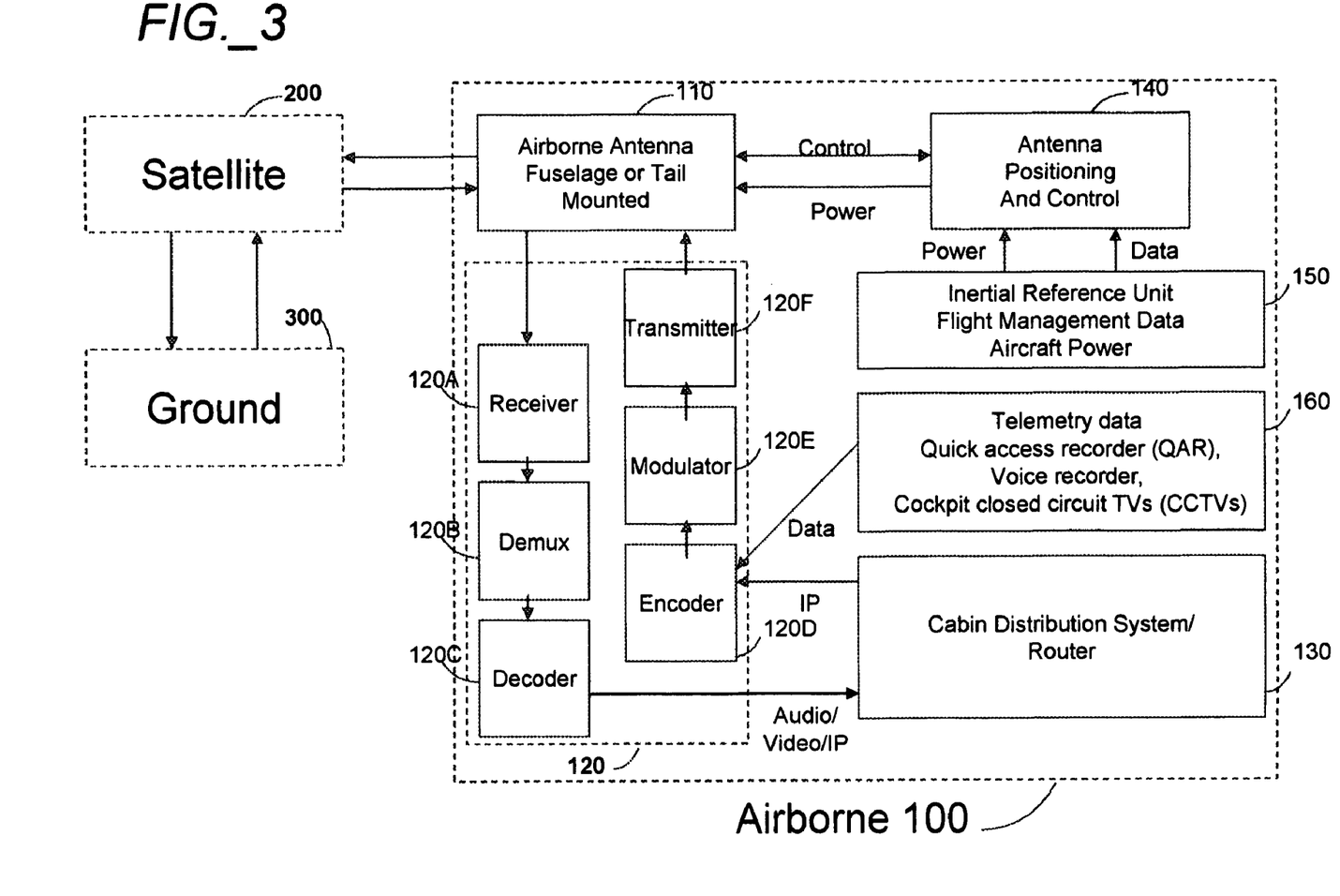
FIG. 3 describes the airborne segment in more detail by a schematic block diagram according to the present invention as embodied in FIGS. 1 and 2. The key elements for said embodiment are listed showing the connections from an airborne receive and transmit antenna to cabin distribution system and router that interfaces with the airborne end users.

FIG. 3 describes the airborne system hardware and their architecture in more detail to clarify the present invention as embodied in FIGS. 1 and 2. The key equipment for said embodiment is an airborne receive and transmit antenna 110 for the airplanes to receive from and transmit to satellites 200. The antenna 110, tail or fuselage mounted, are controlled by antenna positioning and control 140 to orient the antenna toward the satellite for maximum signal strength. The antenna may be of conventional reflector type, lens type, or of phased array.

The airborne RF, IF, and BB equipment includes receiver 120A, demultiplexer 120B, and decoder 120C convert the radio wave signals received by the antenna 110 into base band signals containing audio, video, and textual information. Said signals are then fed into the existing cabin distribution system and router 130. In the return link, the base band signals 160 from passengers, crew, and airplane telemetry as well as the Internet uplink data from cabin distribution system and router 130 are converted into an RF signal by an encoder 120D, modulator 120E, and transmitter 120F, and then uplinked by the airborne antenna 110 to the satellite 200.

The airborne equipment consists of all the equipment necessary to provide service on board an aircraft. It preferably consists of the following equipment:

(a) The tracking antenna transmits and receives signals to and from the assigned satellite(s) during the course of a flight. The antenna is mounted externally to the aircraft within an aerodynamic enclosure to minimize drag. The antenna is equipped with a combined receive/transmit feed. The receive feed is of monopulse design which generates the error signals required to track the satellite during the course of the flight. Initial acquisition is by means of GPS location signals and stored (b) The GPS receiver and antenna provide aircraft location information to the Antenna Tracking Unit to initially acquire the satellite at the beginning of the flight and at times when the service "hands-over" to a different satellite due to coverage limitations. The GPS signals also provide a backup aid to acquiring the satellite should tracking be lost due to aircraft maneuvers, weather or other reasons.

Depending with the arrangements to the customer airline, the GPS signals may be provided by existing aircraft instrumentation.

(c) The receiver tunes to and acquires a selected forward signal from the satellite and demodulates it. The receiver also provides tracking error information from the antenna monopulse feed to the Antenna Tracking Unit.

(d) The Antenna Tracking Unit initially acquires the signal from the selected satellite by using GPS position information combined with the known satellite orbital position to compute antenna look angles. The antenna then performs a conical scan search to acquire the satellite. Once acquired, the Antenna Tracking Unit makes use of error signals derived from the antenna monopulse feed to continuously track the satellite position during the aircraft flight. At a preset geographic position in the flight path, as determined by the GPS derived position information, the Antenna Tracking Unit may switch its pointing to another satellite which provides coverage during the next segment of the flight.

(e) The Decoder and Error Correction Unit takes the output of the Receiver and applies Reed-Solomon and Viterbi (or Turbocode) error correction to the received signal and supplies it to the DEMUX for further processing. The Decoder also verifies the Conditional Access Authorization code on the received frames to verify authenticity.

(f) The DEMUX unit splits the individual data streams from the composite forward link signal. Data streams corresponding to video and audio channels are the supplied to MPEG decoders for further processing. Data streams corresponding to data channels are processed to extract the IP packets and supplied to the router for further processing.

(g) The MPEG Decoders process the digital video and audio streams to reconstitute uncompressed digital video and audio streams.

(h) The Audio D/A Converters process the digital audio streams into analog signals compatible with the existing aircraft entertainment and communication system.

(i) The NTSC/PAL Video Encoders process the digital video streams into analog composite video signals compatible with the existing aircraft entertainment and communication system.

(j) The IP Router takes IP packets received on the forward link and steers them according to routing information in the headers. Network management packets (typically SNMP) are fed to the Control and Telemetry unit. User IP Packets, if authorized by the Conditional Access Authorization Unit, are sent to the IEEE 802.11 wireless access point for broadcast to the cabin. Optionally these packets may be sent via an Ethernet LAN consisting of an Ethernet Hub and wired Ethernet cable directly to passenger seats.

Return IP packets are received by the router either via the IEEE 802.11 wireless link (or via the wired Ethernet LAN, if present) and, if authorized, are sent to the Return Channel Encoder for transmission in the Return Link back to the RUF.

(k) The Conditional Access Authorization Unit receives encrypted authorization messages from the Conditional Access System at the NCC and in response provides access to various services such as video and audio streams and Internet Access to individual passengers.

(l) The Control and Telemetry Unit (CTU) receives and interprets network management packets received from the Network Management System at the NCC via the Router and issues the appropriate commands to the destination unit. The CTU also monitors the operation and performance of the units and periodically reports back status and health information to the Network Management System. The CTU stores and sends satellite location information to the Antenna Tracking Unit for initial acquisition of and handover between satellites.

(m) This is an industry standard IEEE 802.11b Wireless Access Point, which has been qualified to operate in the passenger aircraft cabin environment. Since operation of such units is well known it will not be discussed further.

(n) The Return Channel Encoder formats return IP packets by adding filler packets as required, and adding Reed Solomon and Viterbi (or Turbocode) forward error correction encoding.

(o) The Modulator takes the output digital stream from the Return Channel Encoder and modulates a subcarrier using QPSK, 8PSK, 16, 32 or 64 QAM modulation. This subcarrier is then frequency converted to the uplink frequency and transmitted to the satellite.

(p) The Transmitter takes the output of the modulator and with it feeds the Tracking Antenna. The transmitter is interlocked so that no transmission takes place unless a) a signal is being received from the satellite and b) a command to transmit is received from the Command and Telemetry Unit.

Figure 4:
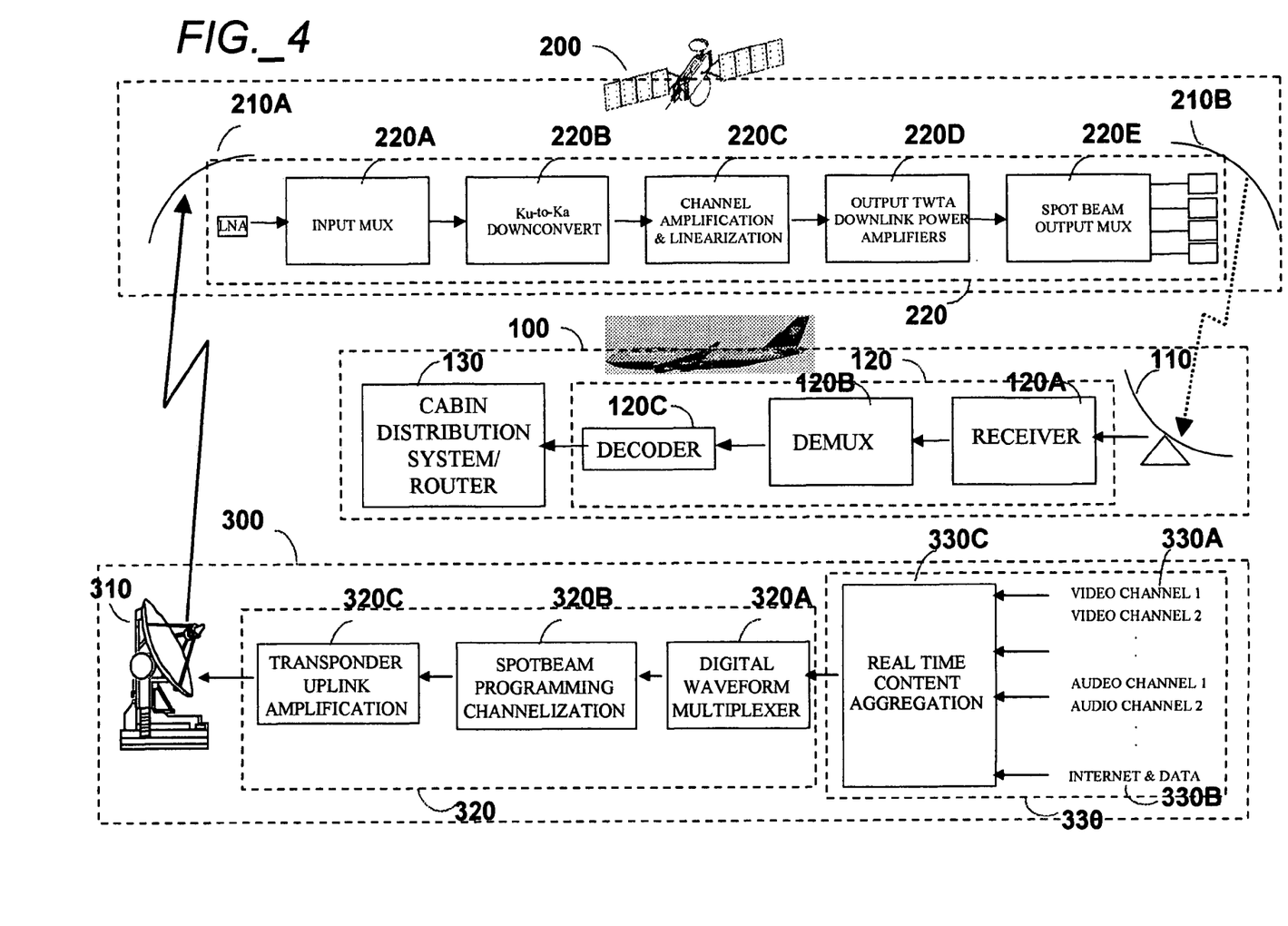
FIG. 4 and FIG. 5 describe preferred forward and the return link operations, respectively, by a schematic block diagram according to the present invention.

FIG. 4 describes a preferred forward link operation in more detail according to the present invention. A plurality of video and audio channels 330A and Internet content 330B are aggregated in real time 330C and transmitted to digital wave form multiplexer 320A, channelized according to spot beam broadcast and communication schedule 320B, suitably amplified 320C, and uplinked in Ku-band wave form by the use of ground antenna 310.

This signal is then received by a satellite receive antenna 210A, amplified and multiplexed 220A, down converted to Ka-band signal 220B, suitably amplified and linearized 220C, suitably amplified by the use of output TWTA and downlink power amplifiers 220D, multiplexed for downlink to spot beams 220E, and then downlinked to spot beams by the use of a plurality of steerable transmit antennas 210B.

This signal is then received by the airborne receive antenna 110 and by means described in FIG. 3, received 120A, demultiplexed 120B, decoded 120C, and transmitted to cabin distribution system and router 130 interfaced to the end users on board.

Figure 5:
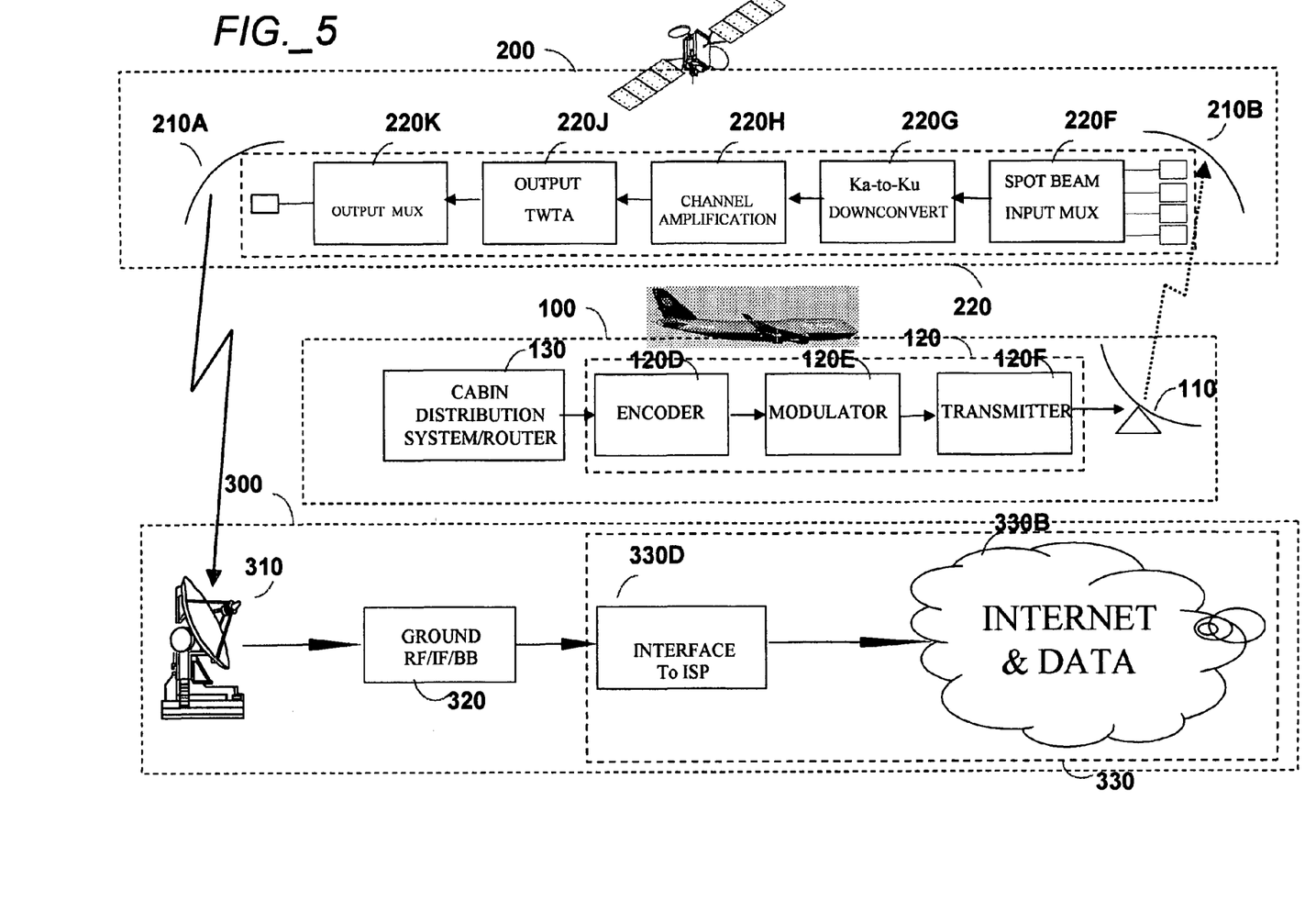

FIG. 5 describes the return link operations in more detail according to the present invention. A plurality of end users from a plurality of spot beams originate internet return, airplane health and security data or closed circuit video data, which are then transmitted to the cabin distribution system and router 130, encoded 120D, modulated 120E, are uplinked via onboard transmitter 120F and transmit antenna 110.

These signals from a plurality of spot beams are then received by a satellite receive antenna 210B, multiplexed 220F, down converted to Ku-band signal 220G, suitably channelized and amplified 220H, suitably amplified by the use of output TWTA 220J, output multiplexed 220K, and then downlinked by the use of the transmit antenna 210A to the ground antenna 310, and with the use of suitable ground RF/IF/BB equipment 320 well known in the art, transmitted to the interface to Internet Service Provider 330D connected to the Internet back bone or data receivers 330B.

A satellite requires certain maintenance that will be performed from a satellite control facility (SCF). An SCF, however, may use its own communication link between itself and said satellite using its own radio wave frequencies, such as Ku-band or S-band The satellite provides the transmission path between the Regional Uplink Facility and the aircraft that are operational in the region. Several satellites may be operated from one RUF in order to provide more extensive coverage or greater capacity in a given region.

The satellite operates as a "bent pipe", that is, it performs frequency translation and amplification of the forward link (RUF to Aircraft) and return link (Aircraft to RUF) signals but does not perform demodulation or remodulation or any baseband processing of these signals.

Figure 6:
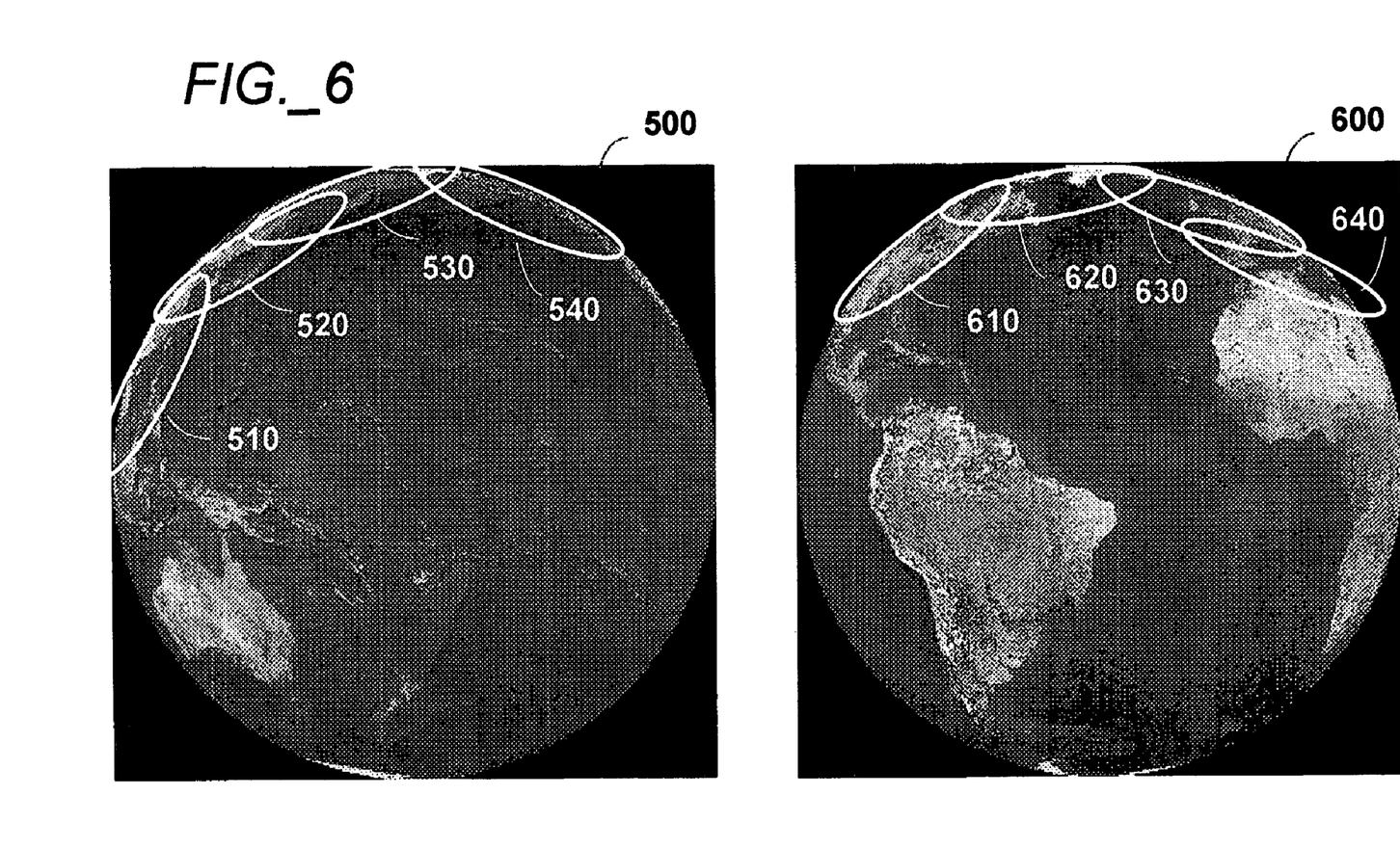
FIG. 6 schematically shows a preferred embodiment of satellite coverage of airplane flight routes with two examples: one suitable to cover the Pacific Ocean flight routes and the other suitable to cover the Atlantic Ocean flight routes.

In FIG. 6, said embodiment requires at least one satellite with a plurality of active Ka-band or V-band transponders for coverage of each of the target airplane flight routes. Said satellite may also contain a plurality of C-band, Ku-band, or Ka-band transponders covering a plurality of ground stations. In said embodiment, one satellite may be located at an orbital location such as 177.5.degree. E 500 to cover the Pacific Ocean flight routes and another at 37.5.degree. W 600 to cover the Atlantic Ocean flight routes. A plurality of satellites may be used for coverage of one or a plurality of flight path(s).

Transponders in said satellite provide coverage beams for the airplane flight paths 500, 600 and the ground stations 300. The satellite spot beams 510, 520, 530, 540, 610, 620, 630, 640 collectively cover the flight routes of said airplanes 100, with one spot beam slightly overlapping with the neighboring spot beams so as to provide said airplanes with a continuous broadcast and communication link to said satellite. Said airplanes 100 may receive DBS channels, Internet data, and weather and flight data. Said airplanes 100 may transmit Internet data, flight data, airplane health data, and/or airline status video such as closed circuit TVs. All data may include one of video information, audio information and textual information.

The invention claimed is:

1. A method of moving broadband data in a communication link extending across a free-space region between a ground station at an altitude substantially below that of rain clouds and an airborne vehicle at an altitude substantially above that of rain clouds via a satellite in earth orbit or in outer space, comprising the steps of:
   communicating broadband data between the airborne vehicle and the satellite in a radio wave at frequencies substantially above 17 Ghz;
   communicating broadband data between to ground station and the satellite in a radio wave at frequencies below 17 Ghz and so low that any rain attenuation is small enough for the communication link to close;
   converting the radio wave at frequencies substantially above 17 Ghz that communicates broadband data from the airborne vehicle to the satellite into to radio wave at frequencies below 17 Ghz and so low that any rain attenuation is small enough for the communication link to close that communicates broadband data from the satellite to the ground station; and
   converting the radio wave at frequencies below 17 Ghz and so low that any rain attenuation is small enough for the communication link to close that communicates broadband data from the ground station to the satellite into the radio wave at frequencies substantially above 17 Ghz that communicates broadband data from the satellite to the airborne vehicle.

2. The method according to claim 1, further comprising the steps of:
   covering the flight routes of one or more of said airborne vehicles by generating a plurality of satellite spot beams.

3. The method according to claim 2, further comprising the steps of:
   flexibly moving the spot beams by space based steerable antennas for coverage of the one or more airborne vehicles.

4. The method according to claim 1, further comprising the steps of:
   aggregating Direct Broadcast Service (DBS) in the broadband data.

5. The method according to claim 1, further comprising the steps of:
   aggregating Internet downlink and uplink in the broadband data.

6. The method according to claim 1, further comprising the steps of:
   including one or more private networks in a ground data network connected to the ground station.

7. The method according to claim 1, further comprising the steps of:
   aggregating video information, audio information and textual information in the broadband data.

8. The method according to claim 1, further comprising the steps of:
   aggregating any or all of flight command data and weather data in the broadband data for communication from to ground station to the airborne vehicle.

9. The method according to claim 1, further comprising the steps of:
   aggregating any or all of airplane health data, security data, cabin and cockpit status video, and closed circuit TV, in the broadband data for communication from the airborne vehicle to the ground station.

10. The method according to claim 1, wherein the frequencies above 17 GHz include at least one of Ka-band frequencies, V-band frequencies, and optical frequencies, and wherein the frequencies below 17 GHz include C-band frequencies or Ku-band frequencies or both.

11. A ground to air, forward link, communication system, comprising
    at least one ground station at an altitude substantially below that of rain clouds,
    at least one satellite in earth orbit or in outer space,
    at least one airborne vehicle at an altitude substantially above that of rain clouds,
    said ground station further comprising a ground data network connected to a ground based transceiver and a ground based antenna,
    said satellite further comprising first space based antenna connected to a space based transceiver and second space based antenna,
    said airborne vehicle further comprising an airborne antenna connected to an airborne transceiver, an airborne means to interface with airborne user terminals,
    wherein said ground station transmits a first forward link signal at frequencies below 17 Ghz and so low that any rain attenuation of first signal when propagated from said ground station to said satellite is small enough for the communication link to close,
    wherein said satellite transmits a second forward link signal at frequencies above 17 Ghz,
    a means to convert the first forward link signal to the second forward link signal on board said satellite,
    wherein broadband data are uplinked in the first forward link signal through a free-space path from said ground station to said satellite, transmitted by said ground data network, said ground based transceiver, and said ground based antenna, and received by said first space based antenna and said space based transceiver,
    wherein the first forward link signal is converted to the second forward link signal on board said satellite by said means to convert, and
    wherein the broadband data are down linked in the second forward link signal through a free-space path from said satellite to said airborne vehicle, transmitted by said space based transceiver connected to said space based second antenna, and received by said airborne antenna connected to said airborne transceiver and said airborne means to interface with airborne user terminals.

12. The system according to claim 11, wherein the frequencies above 17 GHz include at least one of Ka-band frequencies, V-band frequencies, or optical frequencies, and wherein the frequencies below 17 GHz include C-band frequencies or Ku-band frequencies, or both.

13. A ground to air, forward link, and air to ground, return link, communication system, comprising:

at least one airborne vehicle at an altitude substantially above that of rain clouds, at least one satellite in earth orbit or in outer space, at least one ground station at an altitude substantially below that of rain clouds, said satellite further comprising a space based transceiver connected to a first space based antenna and to a second space based antenna, said ground station further comprising a ground based antenna connected to a ground based transceiver and a ground data network, said airborne vehicle further comprising an airborne antenna connected to an airborne transceiver and an airborne means to interface with an airborne user terminal, wherein said ground station transmits a first forward link signal at frequencies below 17 Ghz and so low that any rain attenuation of the first forward link signal when propagated from said ground station to said satellite is small enough for the communication link to close, wherein said satellite transmits a second forward link signal at frequencies substantially above 17 GHz, means for converting the first forward link signal to the second forward link signal on board said satellite, wherein broadband data are uplinked in the first forward link signal through a free-space path from said ground station to said satellite, and received by said first space based antenna and said space based transceiver, wherein the first forward link signal is convened to the second forward link signal on board said satellite by said means for converting, wherein broadband data are down linked in the second forward link signal through a free-space path from said satellite to said airborne vehicle, and received by said airborne antenna connected to said airborne transceiver and said airborne means to interface with the airborne user terminal, wherein said airborne vehicle transmits a first return link signal at frequencies substantially above 17 GHz, wherein said satellite transmits a second return link signal at frequencies below 17 GHz and so low that any rain attenuation of the second return link signal when propagated from said satellite to said ground station is small enough for the communication link to close, means for converting the first return link signal to the second return link signal on board said satellite, wherein broadband data are uplinked in the first return link signal through a free-space path from said airborne vehicle to said satellite, received by said second space based antenna and said space based transceiver, and wherein the broadband data are down linked in the second return link signal through a free-space path from said satellite to said ground station, transmitted by said space based transceiver connected to said first space based antenna and received by said ground based antenna connected to said ground based transceiver and ground data network.

14. The system according to claim 13, wherein the frequencies above 17 GHz include at least one of Ka-band frequencies, V-band frequencies, or optical frequencies, and wherein the frequencies below 17 GHz include C-band frequencies or Ku-band frequencies, or both.

15. A communication system providing a ground to air forward link and an air to ground return link, said communication system comprising:

at least one ground station at an altitude below that of rain clouds, said ground station further comprising a ground based antenna connected via a ground based transceiver to a ground data network;

at least one satellite in an earth orbit or in outer space, said satellite further comprising a space based transceiver for coupling a first satellite based antenna and a second satellite based antenna;

at least one airborne vehicle able to be located at an altitude above that of rain clouds, said airborne vehicle further comprising an airborne antenna connected to an airborne transceiver, and to an interface for an airborne user terminal;

wherein said ground station transmits a first forward link signal to said satellite at frequencies below 17 GHz and so low that any rain attenuation of the first forward link signal when propagated from said ground station to said satellite is small enough to permit communication therebetween;

wherein said satellite transmits a second forward link signal at frequencies substantially above 17 GHz;

wherein said airborne vehicle transmits a first return link signal at frequencies substantially above 17 GHz; and wherein said satellite transmits a second return link signal at frequencies below 17 GHz and so low that any rain attenuation of the second return link signal when propagated from said satellite to said ground station is small enough to permit communication therebetween;

said satellite further including means for converting the first forward link signal to the second forward link signal and for converting the first return link signal to the second return link signal;

whereby broadband data may be unlinked via the first forward link signal through a free-space path from said ground station to said satellite, and received by said first space based antenna, whereby the uplinked broadband data is down linked via the second forward link signal through a free-space path from said satellite to said airborne vehicle for communication with an airborne user terminal, whereby broadband data may be uplinked via the first return link signal through a free-space path from said airborne vehicle to said satellite, and received by said second space based antenna, and whereby the broadband data may be down linked via the second return link signal through a free-space path from said satellite to said ground station, and may be communicated to the ground data network.

16. The system according to claim 11 or claim 13 or claim 15, wherein said satellite further comprises a means of generating a plurality of spot beams to cover the flight routes of said at least one airborne vehicle.

17. The system according to claim 11 or claim 13 or claim 15, wherein said second space based antenna is of steerable type to allow the coverage to be moved flexibly.

18. The system according to claim 11 or claim 13 or claim 15, wherein the data include Direct Broadcast Service (DBS).

19. The system according to claim 11 or claim 13 or claim 15, wherein the data include Internet uplink and down link.

20. The system according to claim 11 or claim 13 or claim 15, wherein said ground data network includes one or more private networks.

21. The system according to claim 11 or claim 13 or claim 15, wherein the data include video information, audio information, and textual information.

22. The system according to claim 11 or claim 13 or claim 15, wherein the forward link communication includes any or all of flight command data and weather data.

23. The system according to claim 11 or claim 13 or claim 15, wherein the return link data include any or all of airplane health data, security data, cabin and cockpit status video, and closed circuit TV.

24. The system according to claim 15, wherein the frequencies above 17 GHz include at least one of Ka-band frequencies, V-band frequencies, or optical frequencies, and wherein the frequencies below 17 GHz include C-band frequencies or Ku-band frequencies, or both.

* * * * *